A. T. McGUINNESS.
ARTIFICIAL TOOTH.
APPLICATION FILED OCT. 30, 1919.

1,382,304. Patented June 21, 1921.

INVENTOR.
Archie T. McGuinness
BY John N. Miller & Geo. Henry
ATTORNEYS.

UNITED STATES PATENT OFFICE.

ARCHIE T. McGUINNESS, OF SAN FRANCISCO, CALIFORNIA.

ARTIFICIAL TOOTH.

1,382,304. Specification of Letters Patent. Patented June 21, 1921.

Application filed October 30, 1919. Serial No. 334,440.

*To all whom it may concern:*

Be it known that I, ARCHIE T. McGUINNESS, a citizen of the United States, and a resident of the city and county of San Francisco, State of California, have invented new and useful Improvements in Artificial Teeth, of which the following is a specification.

My invention has for its object the production of an artificial tooth and a cap and a formed plate between, and is particularly adapted for use on a lower sanitary bridge. It has heretofore been customary, in an effort to put a so-called porcelain occlusal surface on a lower sanitary bridge, to drill through the bridge and set the said facing thereon with metallic pins soldered to the bridge. This makes necessary the completing of the work in a laboratory before fixing the bridge in the mouth, and makes it impossible to reface the bridge without removal from the mouth, and has also the added defect of liability of breakage due to the heating during the soldering operation.

These defects I overcome by providing an occlusal surface and a metallic backing therefor, which backing is of thin metal and is to be soldered in place when building up the bridge. The entire metal structure may then be placed in the mouth, and the occlusal surface having its contour formed to correspond with the metallic backing, is then set in place, as with cement, or by other well known dental methods; or, the said surface may be cemented to the bridge after the soldering operations are complete.

It will be observed that in forming a porcelain occlusal surface and its coöperating metallic backing, as an article of manufacture, I avoid the expert work of drilling and soldering heretofore necessary; and the soldering of my metallic backing with a cap, or bridge, can be accomplished with the greatest facility, and to suit the needs of each particular case and operator, and the subsequent cementing or affixing of the occlusal surface is accomplished with the greatest facility and secure against operative defects.

By referring to the accompanying drawings my invention will be made clear.

Throughout the figures like numerals refer to similar parts.

Numeral 1 indicates the occlusal surface, as of porcelain, and 2 the metallic backing; the bridge is represented by the numeral 3, supported from each side by caps as 4, 5.

Figure 1:
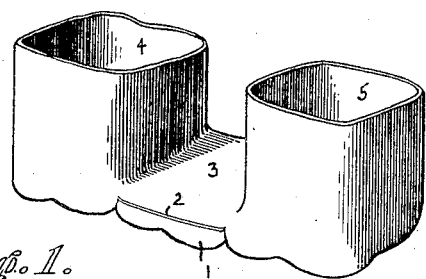
Figure 1 shows a lower sanitary bridge in inverted position with my occlusal surface and backing assembled thereon.
Figures 2, 3:
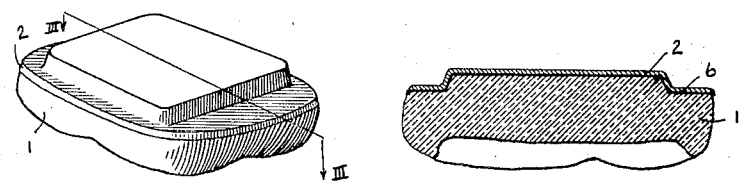
Fig. 2 shows in perspective the assembled backing and occlusal surface as an article of manufacture.
Fig. 3 is a cross section of Fig. 2 on the line III—III.
Figure 4:
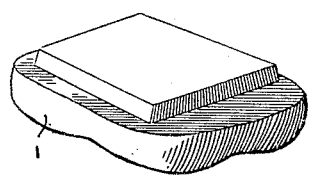
Fig. 4 is a perspective of the occlusal surface of Fig. 2 removed from the backing.
Figure 5:
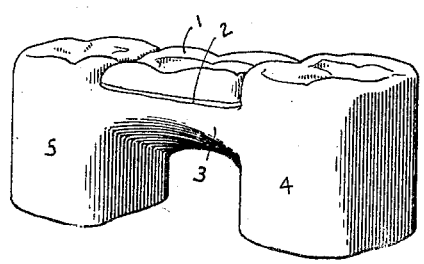
Fig. 5 is a perspective of a lower sanitary bridge in upright position.

Referring particularly to Fig. 3, the metallic backing for the occlusal surface is shown by the numeral 2, with the surface 1 set therein, as by the line of cement 6. The cementing together, however, is not to be performed until the metallic backing 2 has been soldered in place on the bridge wall 3.

The operation is as follows:

The backing, or plate 2, is built onto the bridge wall 3, by well known soldering methods, leaving separated therefrom the occlusal surface 1. The bridge is otherwise completed, and the occlusal surface is now to be put in place by the cement 6 to the backing 2, and the cementing of the bridge in the mouth is now accomplished.

Although I have shown and described my invention as applied to a lower sanitary bridge, it is to be observed that it may be applied to other structures, as caps, or crowns without bridges, and I desire to be understood as claiming all such applications.

I claim:

1. As an article of manufacture, an occlusal surface adapted to fit a recess in a plate, a plate formed of thin metal and recessed for said occlusal surface and adapted to be soldered to a bridge.

2. The method of building up an artificial tooth, consisting of forming a metallic foundation and then soldering thereon a thin plate having a recessed surface and then fixing said metallic foundation to a tooth root and thereafter cementing on said thin plate an occlusal surface.

3. A lower sanitary bridge, comprising a metallic foundation adapted to be fitted to tooth roots, a metallic plate adapted to be soldered to said foundation, and provided with a recess for holding an occlusal surface, and an occlusal surface having its back formed to fit said recess and to be cemented thereto.

In testimony whereof I have hereunto set my hand at the city of San Francisco, California, this 25th day of October, 1919.

ARCHIE T. McGUINNESS.